Sept. 21, 1965  A. WEBER  3,206,791
SUPPORTING SLIDE RAIL
Filed April 2, 1963
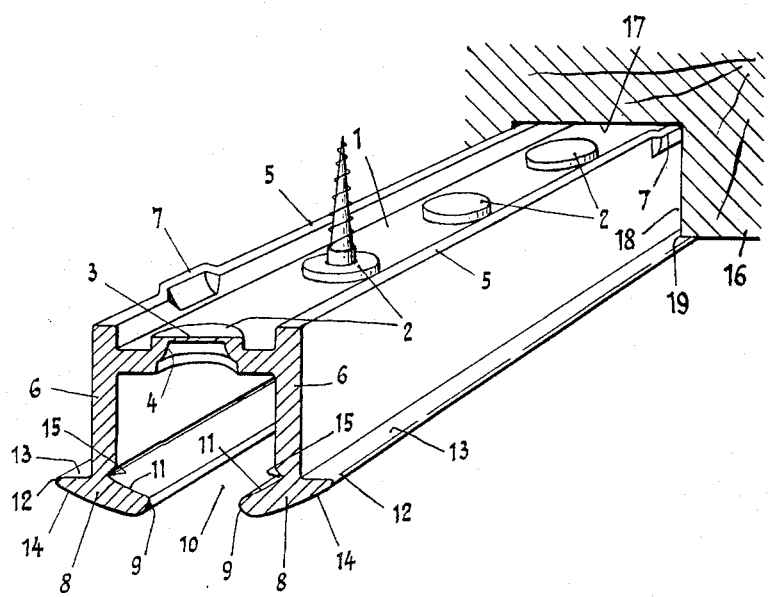
INVENTOR:
Alexander Weber
BY:
Michael S. Striker
his ATTORNEY

United States Patent Office 3,206,791
Patented Sept. 21, 1965

3,206,791
SUPPORTING SLIDE RAIL
Alexander Weber, Zollikofen, near Bern, Switzerland, assignor to Dr. Hans Beer and Mrs. Emma Weber-Horisberger (trading as AWEPA), Bern, Switzerland
Filed Apr. 2, 1963, Ser. No. 270,102
Claims priority, application Switzerland, Apr. 2, 1962, 3,963/62
7 Claims. (Cl. 16—96)

The invention relates to a supporting slide rail for curtains or the like, including a rail wall by which the slide rail is secured in position, and passages for pin-shaped securing elements which passages are provided at intervals on the rail wall in the longitudinal direction of the rail.

Particularly in internal screw rails, it has been found to be desirable for holes for the fixing screws to be provided in advance in the base wall of the rail at such distances apart that, when the rail is fitted, it is unnecessary for additional screw holes to be drilled into the rail which is cut to the length required. Curtain rails are generally stressed most at the ends by the weight of the gathered curtain, and when the cord pull is operated. Curved rail sections also require an increased number of securing positions. For this reason, the screw holes have to be provided at much shorter intervals than is necessary for securing the intermediate, straight sections of the rail in position, one screw being generally sufficient for sections of about 25 cm. of the rail. In these pre-perforated rails, a large number of the holes is, however, not used, and the unused holes, being visible as dark spots, spoil the appearance.

Further disadvantages raise from the fact that the method of drilling and sinking screw holes into the rail during its manufacture in an order of succession independent of the local requirements when it is subsequently fitted, increases the manufacturing costs, the more the smaller the intervals at which the holes are provided. Moreover, burrs may frequently remain at the external edges of the holes, which burrs may cause injury when the rails are handled, and dust, such as residues of concrete, plaster, or the like, and other dirt may adhere thereto. While it may be possible for the holes to be punched instead of being drilled, this would cause undesirable deformation in precision rails extruded from a light metal and having an internal sliding profile of a width less than the width of a finger. Furthermore gritty dust particles, residues of paint or varnish, resin, and the like passing through unused holes of the rail to the sliding surfaces of the rail when it is fitted, may have an extremely detrimental effect on the sliding properties of the gliders.

According to the invention these disadvantages are avoided by providing the rail walls with passages and cup-shaped grooves at the positions of the passages, each groove forming on the inlet side of a recess for securing the fastening elements, and projections on the outlet side, the base of which is reduced to a fraction of the thickness of the rail wall, thus enabling manual perforation.

The invention is diagrammatically illustrated by way of example in the accompanying drawing which shows a perspective view of a supporting slide rail for curtains.

Provided at intervals in the base wall 1 of the internal screw rail of U-section shown in the drawing, in the longitudinal direction of the rail are passages for pin-shaped securing means, such as screws. The passages are formed by projections 2 which, on the inside of the rail, form cup-shaped recesses, and on the outside form cylindrical elevations which project from the base wall 1, and which have a flat top face 3 having a diameter of about 3.5 mm., the thickness of the face 3 being less than a fraction of the wall thickness of the base wall 1, for example, to a thickness of 0.2 mm. The cup 4 on the inside is tapered in the direction of the surface 3, and is of cylindrical section in the direction of the edge to receive the head of a fixing screw, not shown in the drawing; the surface 3 of the projection is manually perforated with the point of the screw driver when the rail is secured by the screw to a support. The projections are preferably provided at regular intervals of about 1.5 to 2 cm. along the entire length of the rail. The passages not used when the rail is fitted, remain closed or sealed.

At each longitudinal edge of the base wall 1 the series of projections is flanked by a longitudinal rib 5 which projects from the base wall 1 at least to the same extent as the projections 2, and which is formed by one or the other side wall 6 of the rail. The risk of rails placed in readiness on the surface of a table leaving scratches thereon or causing injury upon being handled is reduced by the ribs 5. The ribs 5 are recessed at positions on alternate sides in staggered relation in the longitudinal direction to form cams 7 which project slightly above the respective side wall 6, and thus serve an additional purpose.

When the internal screw rail is inserted in a supporting groove, the cams 7 constitute provisional securing means, so that the rail may be placed provisionally into the groove along its entire length, and may be held in position therein against the lateral walls of the groove by a slight clamping of the cams 7 before it is secured permanently in position by screws.

At the end of the length of the side walls 6 opposite the ribs 5, longitudinal flanges 8 are provided which, with opposing edges 9 projecting from the side walls 6 limit the width of the longitudinal rail slot 10, and on the inner face form a cylindrical sliding surface 11 for internal gliders, the surface 11 being inclined towards the rail slot 10. In the other side, the longitudinal flanges project laterally outwards from the respective side wall 6 and are tapered in the direction of the outer edge 12. The surface 13 of the flange 8 extends at right angles from the side wall 6 and engages subsequently over the edge of the supporting groove in which the rail is secured in position. The under surface 14 of the flange 8 remote from the side wall 6 is disposed at an angle thereto and may be of substantially cylindrical section. Provided in the internal angle formed by the side wall 6 and the longitudinal flange 8 is a longitudinal groove 15 one wall of which is formed by the surface 11, and which may contain a liquid or semi-liquid lubricant which is held in position in the groove by capillary action. In order to obtain the optimum sliding properties, the burnished sliding surfaces 11 of the aluminum rails are preferably impregnated with a silicon fluid. Silicon fluid then remains in the grooves 15 whence traces thereof are passed to and distributed over the sliding surfaces by the gliders as they reciprocate across throughout the years of use.

Furthermore, as compared with the conventional rails, the constructions of the flanged part of the rail hereinbefore described results in a saving in material which may be of substantial importance according to the length of the rail.

What I claim is:
1. An elongated supporting slide rail for curtains or the like, including an elongated rail wall adapted to be fastened to a support with an outer surface of said rail wall facing said support, said rail wall being formed along opposite longitudinal edges thereof with spacer means projecting above said outer surface for spacing said rail wall from said support, and being further formed intermediate said spacer means throughout its length at longitudinally spaced portions with projections perpendicular to said outer surface and of a height not exceeding the height of said spacer means and being further provided with cor- responding cavities extending from the inner surface of said rail wall toward but short of the upper surface of said projections so as to reduce the wall thickness only at said portions to a small fraction of the wall thickness of the remainder of said rail wall so that said portions of reduced thickness may be easily perforated for extending a securing element therethrough; and means arranged on said rail wall and extending longitudinally of said elongated supporting slide rail for supporting a slider thereon.

2. An elongated substantially U-shaped supporting slide rail for curtains or the like comprising, in combination, a pair of spaced elongated side walls; a transverse wall extending between said side walls adjacent the longitudinal edge portions of the latter, said slide rail being formed with a pair of longitudinal ribs along the edges of said transverse wall adapted to abut against a support and having a predetermined maximum height, said transverse wall being formed at longitudinally spaced portions thereof with projections projecting outwardly from the outer surface thereof to a height at most equal to said predetermined height of said ribs and at corresponding portions with cavities extending from the inner surface thereof into said projections so as to leave at each projection a transverse wall portion of a thickness which is only a small fraction of the wall thickness of said transverse wall so that said transverse wall portions of reduced thickness may be easily perforated for extending a securing element therethrough; and means extending longitudinally along said side walls at portions thereof spaced from said longitudinal ribs for supporting a slider on said supporting side rail.

3. A supporting slide rail as set forth in claim 2, wherein each of said cavities is of substantially frusto-conical configuration for housing the head of a securing element.

4. An elongated substantially U-shaped supporting slide rail for curtains or the like comprising, in combination, a pair of spaced elongated side walls; a transverse wall extending between said side walls adjacent the longitudinal edge portions of the latter, said side walls projecting with edge portions thereof beyond the outer surface of said transverse wall and forming a pair of longitudinal ribs along the edges of said transverse wall adapted to abut against a support, said transverse wall being formed at longitudinally spaced portions thereof with projections projecting from the outer surface thereof to a height at most equal to that of said ribs and at corresponding portions with cavities extending from the inner surface thereof into said projections so as to form at each projection a raised transverse wall portion of a thickness which is only a small fraction of the wall thickness of said transverse wall so that said transverse wall portions of reduced thickness may be easily perforated for extending a securing element therethrough; a plurality of longitudinally spaced cam-shaped projections respectively projecting outwardly from said ribs for temporarily securing said supporting slide rail in a groove formed in the support; and means extending longitudinally along said side walls at portions thereof spaced from said ribs and said cam-shaped projections for supporting a slider on said supporting slide rail.

5. A supporting slide rail as set forth in claim 4, wherein said cam-shaped projections on one rib are arranged in staggered relationship to the cam-shaped projection on the other rib.

6. An elongated substantially U-shaped supporting slide rail for curtains or the like comprising, in combination, a pair of spaced elongated side walls; a transverse wall extending between said side walls adjacent the longitudinal edge portions of the latter, said side walls projecting with edge portions thereof beyond the outer surface of said transverse wall and forming a pair of longitudinal ribs along the edges of said transverse wall adapted to abut against a support, said transverse wall being formed at longitudinally spaced portions thereof with projections projecting from the outer surface thereof to a height at most equal to that of said ribs and at corresponding portions with cavities extending from the inner surface thereof into said projections so as to leave at each projection a transverse wall portion of a thickness which is only a small fraction of the wall thickness of said transverse wall so that said transverse wall portions of reduced thickness may be easily perforated for extending a securing element therethrough; and a pair of longitudinal flanges extending along the edge portions of said side walls opposite to said ribs and respectively projecting to opposite sides of said side walls, said flanges having inner portions to support a slider thereon.

7. An elongated substantially U-shaped supporting slide rail for curtains or the like comprising, in combination, a pair of spaced elongated side walls; a transverse wall extending between said side walls adjacent the longitudinal edge portions of the latter, said side walls projecting with edge portions thereof beyond the outer surface of said transverse wall and forming a pair of longitudinal ribs along the edges of said transverse wall adapted to abut against a support, said transverse wall being formed at longitudinally spaced portions thereof with projections projecting from the outer surface thereof to a height at most equal to that of said ribs and at corresponding portions with cavities extending from the inner surface thereof into said projections so as to leave at each projection a transverse wall portion of a thickness which is only a small fraction of the wall thickness of said transverse wall so that said transverse wall portions of reduced thickness may be easily perforated for extending a securing element therethrough; and a pair of longitudinal flanges extending along the edge portions of said side walls opposite to said ribs and respectively projecting to opposite sides of said side walls, said flanges having inner portions to support a slider thereon, the inner portion of each flange having a surface facing said transverse wall and including with the inner surface of the respective side wall an obtuse angle, and each side wall being formed at the inner surface thereof at the junction with said surface of said inner portion of the respective flange with an undercut forming at said junction a longitudinally extending groove adapted to retain a lubricant by capillary action.

References Cited by the Examiner

UNITED STATES PATENTS

| | | | |
|---|---|---|---|
| 2,767,423 | 10/56 | Gang et al. | 16—94 |
| 2,821,738 | 2/58 | McDonald | 16—96 |
| 3,064,304 | 11/62 | Weber | 16—93 |
| 3,094,197 | 6/63 | Attwood. | |
| 3,098,520 | 7/63 | Greenstadt et al. | 160—346 |

FOREIGN PATENTS

| | | |
|---|---|---|
| 733,529 | 3/43 | Germany. |
| 1,048,685 | 1/59 | Germany. |

DONLEY J. STOCKING, *Primary Examiner.*